United States Patent Office 3,316,284
Patented Apr. 25, 1967

---

3,316,284
ALKYLTIN CYANOIMIDODITHIOCARBONATES
Walter A. Stamm, Tarrytown, and Carl C. Greco, Bronx, N.Y., assignors to Stauffer Chemical Company, New York, N.Y., a corporation of Delaware
No Drawing. Filed Nov. 14, 1963, Ser. No. 323,561
6 Claims. (Cl. 260—429.7)

This invention relates to organotin compounds and in particular to alkyltin cyanoimidodithiocarbonates. The invention also pertains to a method of preparing the aforenamed compounds.

The new and novel organotin compounds as contemplated herein can be depicted by the following chemical formulae:

(I)
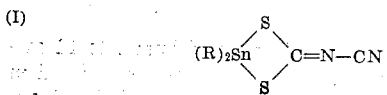

and (II)
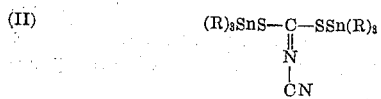

wherein R designates an alkyl radical having from 1 to 12 carbon atoms, it being understood that the alkyl radical may be of the straight or branched type.

It has been our finding that the organotin compounds of the invention can be realized by reacting an alkaline earth metal cyanoimidodithiocarbonate with an alkyltin halide whereby the calcium of the calcium cyanoimidodithiocarbonate is replaced by an alkyltin residue. As will be observed from an inspection of the chemical equations delineated below, two reaction products can be formed. On the one hand, where the calcium cyanoimidodithiocarbonate is reacted with a dialkyltin dihalide, a cyclic structure is produced. On the other hand, where a trialkyltin halide is used, the resulting product has a linear structure. Both products, however, can be regarded as organotin cyanoimidodithiocarbonates. The above referred to equations are as follows:

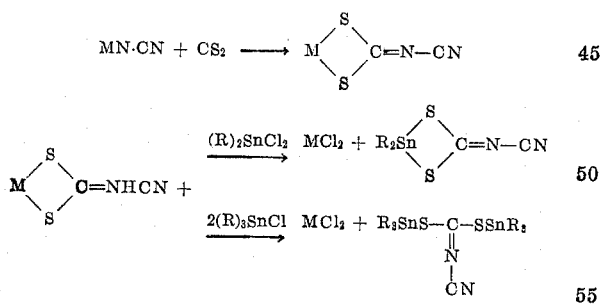

wherein M represents an alkaline earth metal such as calcium barium or strontium, and R has the significance as previously set forth. In preparing the alkyltin cyanoimidodithiocarbonates of the invention, excellent results are achieved by forming the calcium cyanoimidodithiocarbonate from an alkaline earth cyanamide and $CS_2$ in aqueous media and reacting the so-obtained calcium cyanoimidodithiocarbonate in situ with the requisite alkyltin chloride followed by isolation of the desired alkyltin cyanoimidodithiocarbonate. A convenient and recommended procedure consists in refluxing calcium cyanamide with carbon disulfide in water followed by introduction of the requisite alkyltin chloride and the resulting mixture subjected to another period of heating. The alkyltin cyanoimidodithiocarbonate is preferably isolated from the reaction mixture by distillation or crystallization.

Reference is now made to the following examples which are submitted for the purpose of illustration only and are not to be construed as placing or imposing any limitation on the invention. It is furthermore to be understood that variations in practicing the invention without departing from the scope or spirit thereof will be appreciated and understood by those skilled in the art to which the said invention pertains.

Example 1

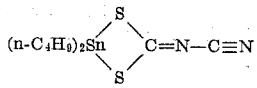

Di-n-butyltin Cyanodithioimidocarbonate

A mixture of 30.0 g. (0.37 mole) of calcium cyanamide, 28.5 g. (0.37 mole) of carbon disulfide and 175 ml. of water was placed in a flask provided with a stirrer, reflux condenser and a thermometer and the resulting mixture heated at a temperature of between 40–45° for a period of five hours. The reaction mixture was then filtered to remove insoluble impurities and the filtrate returned to the reaction flask. 40.0 g. (0.13 mole) of dibutyltin dichloride dissolved in 80 ml. of acetone was added dropwise to the filtrate at 50° C. After the introduction of the dibutyltin dichloride, the reaction mixture was maintained at 65° C. for one hour after which the acetone and excess carbon disulfide were removed by distillation and the residue heated an additional two hours at 65° C. The solid reaction product was filtered off and washed with pentane and water. After drying, there was obtained 30.0 g. (70% yield) of a colorless, crystalline solid melting at 145° C. Chemical and spectroscopic analysis was in conformity with the above depicted structure.

Example 2

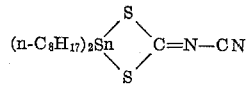

Di-n-octyltin cyanodithioimidocarbonate

This compound was prepared in accordance with the procedure of Example 1 but using as the reactants 30.0 g. (0.37 mole) calcium cyanamide, 28.5 g. (0.37 mole) of carbon disulfide and 54.1 g. (0.13 mole) of dioctyltin dichloride. The yield of colorless, crystalline solid was 75% (43.0 g.); melting point 135° C.

Example 3

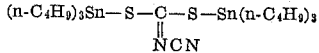

Bis(tri-n-butyltin) cyanodithioimidocarbonate

A mixture of 30.0 g. (0.375 mole) of calcium cyanamide, 28.5 g. (0.375 mole) of carbon disulfide and 180 ml. of water was heated with thorough agitation for five hours at 40–45° C. After filtering off the precipitate, the deep yellow filtrate was transferred to a 500 ml., 3-necked flask equipped with stirrer, thermometer and dropping funnel. To the aforesaid solution was added dropwise 65.0 g. (0.20 mole) of tributyltin chloride, the temperature during the addition being maintained at 50° C. Following the addition, the contents of the flask were kept at 65° C. for five hours and after cooling, extracted with benzene. The extracts were dried over anhydrous sodium sulfate and the solvent and volatile components removed by distillation. The crude residual product was purified by vacuum distillation, the boiling point of the purified material being 145° C./0.3 mm.; yield 60.0 g. (85%); $N_D^{23}$ 1.5276.

Example 4

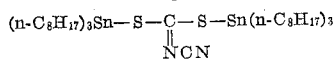

Bis(tri-n-octyltin)cyanodithioimidocarbonate

This compound was prepared in accordance with the procedure given in Example 3. In general, the yield and results paralleled those obtained with the previous example.

The alkyltin cyanoimidodithiocarbonates as described herein are new and useful chemical entities exhibiting useful properties. For instance, it has been ascertained that such compounds are effective as anti-oxidants and as satbilizers for polymeric materials such as PVC, polyolefins, rubber and the like. Other uses include catalysts for promoting polymerizations, condensations, and as curing agents for resins.

We claim:

1. An organotin compound selected from the class consisting of

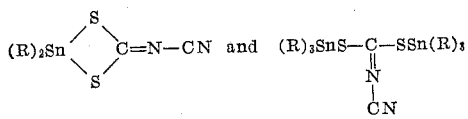

wherein R represents an alkyl group of from 1 to 12 carbon atoms.

2. An organotin compound of the formula

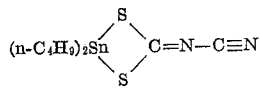

3. An organotin compound of the formula

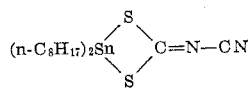

4. An organotin compound of the formula

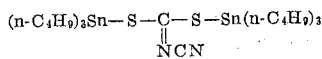

5. An organotin compound of the formula

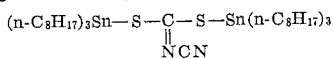

6. A method of preparing an alkyltin cyanoimidodithiocarbonate selected from the class consisting of

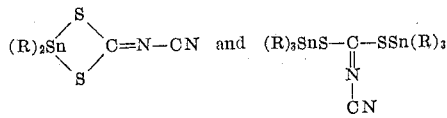

wherein R represents an alkyl group of from 1 to 12 carbon atoms, comprising in the case of where R is taken twice reacting one mole of calcium cyanoimidodithiocarbonate with one mole of $(R)_2SnCl_2$, and in the case of where R is taken three times, with two moles of $(R)_3SnCl$ and isolating the so-obtained alkyltin cyanoimidodithiocarbonate.

No references cited.

TOBIAS E. LEVOW, *Primary Examiner.*

W. F. W. BELLAMY, *Assistant Examiner.*